United States Patent

[11] 3,626,262

[72] Inventor Leroy U. C. Kelling
 Waynesboro, Va.
[21] Appl. No. 852,412
[22] Filed Aug. 22, 1969
[45] Patented Dec. 7, 1971
[73] Assignee General Electric Company

[54] NO-LOAD TORQUE COMPENSATION SYSTEM AND THE APPLICATION THEREOF IN ADAPTIVE CONTROL
5 Claims, 1 Drawing Fig.

[52] U.S. Cl. .................................................... 318/39,
 235/92 MP, 235/151.11
[51] Int. Cl. ...................................................... B23q 5/10,
 G06g 7/00, G06g 7/12
[50] Field of Search .......................................... 318/20, 39,
 20.120, 563; 340/347 A–347 D; 235/151.11, 154;
 173/5

[56] References Cited
 UNITED STATES PATENTS
2,864,010 12/1958 Rosenberg et al. ............ 235/151.11 UX
2,965,891 12/1960 Martin ............................ 340/347
3,062,995 11/1962 Raymond et al. ............... 235/151.11 UX
3,138,750 6/1964 Borger et al. .................. 318/563
3,236,124 2/1966 Rhoades ......................... 235/151.11
3,269,233 8/1966 Lothmann ...................... 235/151.11
3,281,583 10/1966 Zeldmann ...................... 318/563
3,348,208 10/1967 Rosener ......................... 235/151.11 X
3,439,346 4/1969 McGee ........................... 235/151.11 X
3,445,839 5/1969 Engelberg et al. ............. 340/347 UX
3,492,467 1/1970 Caban et al. ................... 235/151.11

Primary Examiner—Maynard R. Wilbur
Assistant Examiner—Thomas J. Sloyan
Attorneys—Frank L. Neuhauser, William S. Wolfe, Oscar B. Waddell, Joseph B. Forman and Gerald R. Woods ABSTRACT: The torque losses in the spindle drive of a cutting tool rotating under no-load conditions are measured and stored in digital form. The stored value is used to modify programmed torque values during a later cutting operation so as to achieve the programmed torque at the cutting tool rather than merely at the spindle drive.

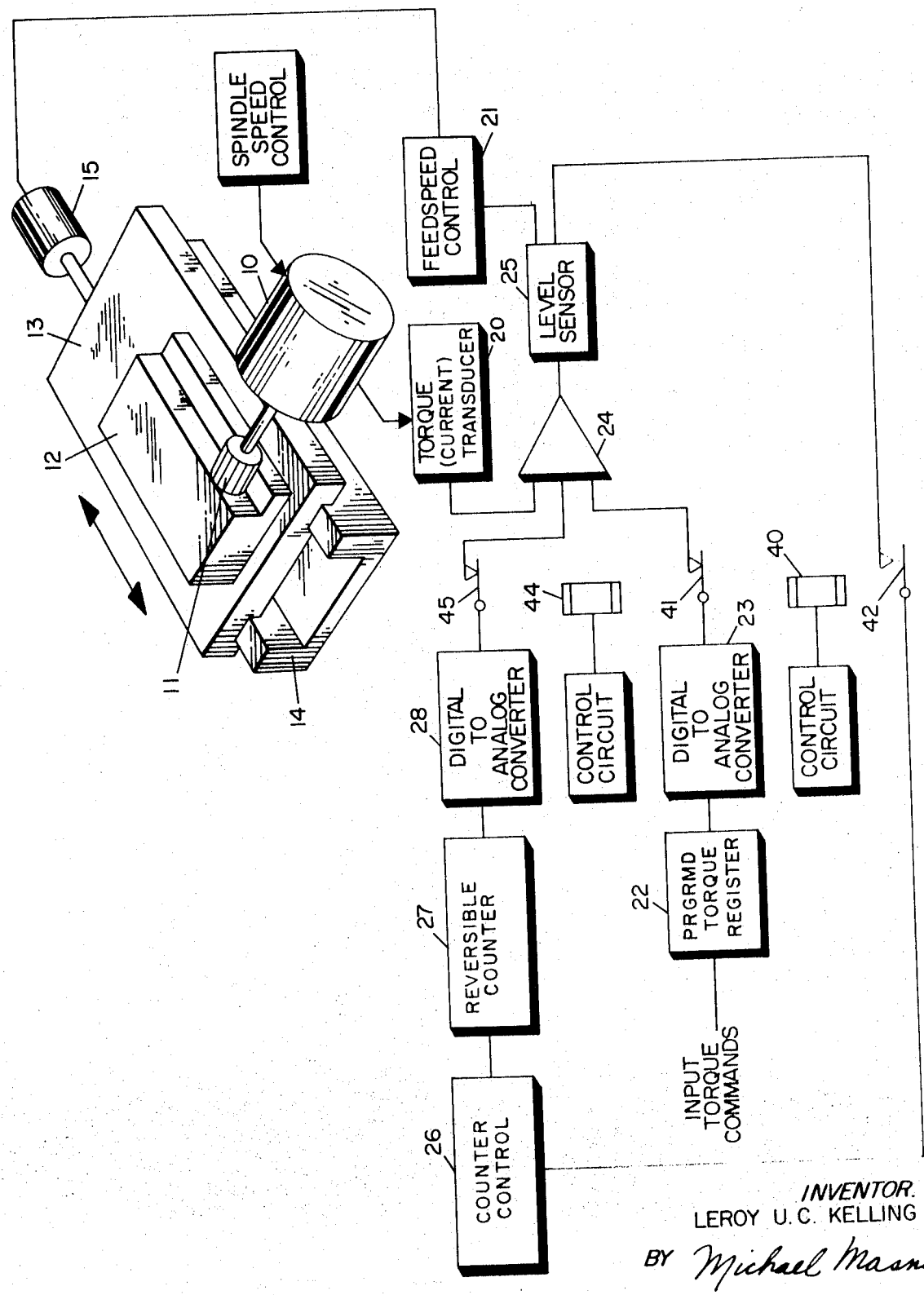

NO-LOAD TORQUE COMPENSATION SYSTEM AND THE APPLICATION THEREOF IN ADAPTIVE CONTROL

BACKGROUND OF THE INVENTION

This invention relates to an adaptive control system and more particularly to a system for compensating for load-independent torque losses in a drive motor.

In material processing operations, such as milling, drilling, boring, etc., a machine tool and the material to be worked are moved relative to one another at preselected speeds. These preselected speeds are based upon the supposition that for any given material and tool, various parameters such as machinability of material and geometry of the cutting tool will remain constant. With this assumption, the use of a single or preselected cutting speed should produce an efficient cutting operation. However, in actual practice, the parameters do not remain constant, but rather are constantly fluctuating so that the conventional cutting practices of the past are not the most effective. Cutters become dull and hard spots and areas of different machinability occur in the course of the cutting operation. Furthermore, motors exhibit different characteristics under different operation conditions. Numerous systems have been proposed for adapting input control information in order to develop specific machine control signals which are compensated for the variable factors encountered with each individual operation. Such an adaptive control system is disclosed, for example, in patent application Ser. No. 633,295, filed Apr. 24, 1967, and assigned to the General Electric Company.

SUMMARY OF THE INVENTION

An object of the present invention is to provide an adaptive control system for the torque of a machine element, wherein the torque control input data is modified with compensating data in order to account for the load independent torque losses such as friction and windage losses experienced by the machine at the particular operating conditions encountered.

In accordance with one aspect of the invention, there is provided a method including the steps of measuring the motor armature current first under no-load conditions to obtain a first analog signal and later under load conditions to obtain a third analog signal. The first analog signal is stored for use after no-load operations have ceased. During a subsequent period of operation under load, a second analog signal representing a programmed torque value is combined with the first and third signals to establish the deviation between actual and programmed torques at the load. The load is adjusted to bring the torques into correspondence.

In accordance with yet another illustrative embodiment of the invention, there is provided apparatus for carrying out the method set forth above.

The novel features, as well as additional objects of the invention, will be more clearly understood and appreciated following a consideration of the detailed description which is taken in conjunction with the accompanying drawing.

BRIEF DESCRIPTION OF THE DRAWING

The single FIGURE presented with this description, illustrates the adaptive control feature of the invention as applied in a machine tool control system.

DETAILED DESCRIPTION OF AN ILLUSTRATIVE EMBODIMENT

The FIGURE illustrates a spindle motor 10 controlling a cutter 11 which is adapted to operate upon a workpiece 12. The workpiece is mounted upon a table 13 that is part of the machine and which is adapted to be driven along machine ways 14 by a screw connected to feed motor 15. Motor 10 is assumed to be driven at some controlled speed rate and torque transducer 20 is provided for detecting the torque developed by the motor. Conventionally, transducer 20 senses the motor armature current and produces an output proportional thereto. The actual cutting torque or the torque exerted on the rotating cutter 11 by the workpiece 12 is in part a function of the rate of feed which is under the direct control of feed speed control circuit 21 for the feed motor 15.

A programmed torque value is supplied in digital form to a programmed torque register 22. This register in turn provides digital data to a digital-to-analog converter 23, which provides one input to an amplifier 24. Another input to amplifier 24 is provided by the torque transducer 20. Assuming that the polarity of the output from digital-to-analog converter 23 is opposite to that of the torque transducer 20, amplifier 24 produces an output when the sensed motor torque differs substantially from the programmed torque. In a conventional manner, the output of amplifier 24 is supplied to a level sensor 25, the output of which controls feed speed control 21. Level sensor 25 produces discrete levels of output signals for different ranges of input signals. For example, level sensor 25 might output a voltage of 7.5 volts for inputs within the range of 5 to 10 volts. Similarly, input voltages within the range of 10 to 15 volts might produce a constant 12.5 volt output.

In operating the equipment with the elements thus far described, spindle motor 10 will provide a torque equivalent to the programmed torque. However, torque delivered at the cutter 11 is less than the torque of the motor itself. Variations in the feed speed, motor speed, temperature, cutter, and other conditions create losses between the motor and the cutter and it is important to compensate for these losses. In accordance with the present invention, data corresponding to the no-load torque of the unit under anticipated conditions is stored in digital form to provide compensatory data so that the control system establishes a cutter torque equivalent to the programmed torque. The need for such no-load torque data is particularly important when using tools with cutting torques approaching the magnitude of the friction and windage torque.

To obtain no-load torque data, spindle motor 10 is operated without a cutting load at the speed and under the ambient operating conditions anticipated. While thus operating, relay 40 is actuated to open contacts 41 and close contacts 42. Accordingly, torque transducer 20 provides an analog voltage proportional to the no-load torque to amplifier 24, the output of which is sensed by level sensor 25 and applied via lead 30 and contacts 42 to the input of a counter control 26.

In a particular embodiment of the invention, counter control 26 comprises gating means adapted to effect the countup or countdown of a reversible counter 27 in accordance with whether or not level sensor 25 detects a positive or negative disparity between the output from digital-to-analog converter 28 and the output of torque transducer 20. Initially, counter 27 contains a count of zero. Torque transducer 20 provides a negative signal having an amplitude commensurate with the no-load torque of spindle motor 10 to amplifier 24. Level sensor 25 provides a voltage to counter control 26 to effect a counting up of the reversible counter 27. The digital data registered in this counter is applied in a conventional fashion to digital-to-analog converter 28 and its corresponding analog value, then appears as a positive potential at the output thereof. The operation of counting up the reversible counter 27 will continue until the output of digital-to-analog converter 28 is substantially equal to that of torque transducer 20. When substantial equality is attained, the value of digits stored in reversible counter 27 represents the no-load torque of spindle motor 10.

During the initial setup operations, the steps previously mentioned for establishing a registration in reversible counter 27 are carried out. When reversible counter command storage 27 has attained a stable state, relay 40 is deenergized thereby closing contacts 41 to connect digital-to-analog converter 23 to one input of amplifier 24, and opening contacts 42 to disconnect the output from level sensor 25 to counter control 26.

It is important to note again, that the circuitry stores digital data representative of the no-load torque of the spindle motor, in spite of the fact that the analog input signal is removed upon opening of contacts 42. Obviously, removal of the analog signal is essential because it will change during the subsequent operation of the machinery. On the other hand, it is important that the compensation data be retained in its original form so that it may be used throughout the operation.

During the actual machine operation, the three inputs to the amplifier 24 are each active. Thus, torque transducer 20 provides a feedback signal of a first polarity indicative of the actual torque of spindle motor 10, digital-to-analog converter 28 provides a signal of opposite polarity indicative of the no-load torque of spindle motor 10, and digital-to-analog converter 23 provides an analog signal of opposite polarity indicative of the programmed cutting head torque. The sum of the latter two quantities in comparison with the actual feedback from torque transducer 20, is effective via amplifier 24 and level sensor 25 to establish the required feed speed control to effect the desired torque at the cutting head.

In the preceding disclosure, the means of measuring and storing the torque losses have been described as a digital counter and a digital-to-analog converter. The same function could well be performed by a reversible, motor-operated potentiometer. In this case, the up and down counter control signals from 26 would be used to control the rotation of the potentiometer drive motor. The potentiometer would have a suitable DC voltage applied across its extremities and a resistor in series with its movable contact for connection to the input of the amplifier 24 in place of the digital-to-analog conversion means 28.

Quite clearly, the illustrative embodiments of the present invention have been described in conjunction with particular components and interconnections. It will be immediately apparent to those skilled in the art, that modifications may be made in the described embodiments. It is intended in the following claims to encompass all such modifications as come within the true spirit and teaching of the invention hereinabove disclosed.

We claim:

1. A method for controlling the torque of a motor at its load so as to compensate for load-independent torque losses comprising the steps of:
    a. monitoring the motor armature current as the motor is operated under no-load conditions to obtain a first analog signal;
    b. converting the first analog signal to digital form for storage;
    c. storing said digital form of said first analog signal;
    d. providing a second analog signal representative of a desired torque at the load;
    e. operating the motor under load;
    f. monitoring the motor armature current as the motor is being operated under load to obtain a third analog signal;
    g. recovering from storage said digital form;
    h. converting said digital form to the original first analog signal;
    i. algebraically combining said first, second and third analog signals to determine the deviation between the desired torque at the load and the actual torque at the load; and
    j. adjusting the load on the motor to bring the actual torque into correspondence with the desired torque.

2. Apparatus for controlling the torque of a motor at its load so as to compensate for load-independent torque losses comprising:
    a. a torque transducer for monitoring the motor armature current both under no-load conditions to produce a first analog signal and subsequently under load conditions to produce a third analog signal;
    b. storage means connected to said transducer for storing the first analog signal for use after no-load operation has ceased;
    c. input means for providing a second analog signal representing a desired torque at the load under load conditions;
    d. means connected to said transducer, said storage means an said input means for combining said first, second and third analog signals while the motor is operating under load conditions to establish the deviation between the actual and the desired torque at the load under existing conditions; and
    e. means responsive to the output of said combining means for adjusting the load on the motor to bring the actual torque into correspondence with the desired torque during cutting operation.

3. Apparatus for controlling the torque of a motor at the cutting head of a material cutting machine including compensation for the no-load torque losses of the motor, said apparatus comprising:
    a. a torque transducer for monitoring the motor armature current under no-load conditions and subsequently during cutting operations to produce first and third analog signals respectively;
    b. a storage means selectively connected to said transducer for storing the first analog signal for use during a subsequent cutting operation;
    c. input means for selectively providing a second analog signal representing a desired cutting torque;
    d. means selectively connected to said transducer, said storage means and said input means during cutting operations for combining said first, second and third analog signals to establish the deviation between the actual and the desired cutting torque; and
    e. means responsive to the output of said combining means for adjusting the cutting load to bring the actual torque into correspondence with the desired torque.

4. Apparatus as recited in claim 3 wherein said storage means further comprises:
    a. a reversible digital counter;
    b. means connected to said transducer for converting the first analog signal to a digital form signal for storage in said counter; and
    c. means connected between the output of said counter and said combining means for converting the digital form signal back to analog form before it is applied to said combining means.

5. Apparatus as recited in claim 3 further including means for disconnecting said storage means and said input means from said combining means during no-load motor operation and for closing said connection while disconnecting said storage means from said transducer during operation under load, whereby the stored first analog signal can be updated only during the no-load periods of operation preceding each period of cutting operation.

* * * * *